United States Patent [19]

Phillips

[11] 4,246,017
[45] Jan. 20, 1981

[54] METHOD AND APPARATUS FOR FORMING MINERAL FIBERS

[75] Inventor: John D. Phillips, Newark, Ohio

[73] Assignee: Owens-Corning Fiberglas Corporation, Toledo, Ohio

[21] Appl. No.: 95,011

[22] Filed: Nov. 16, 1979

[51] Int. Cl.³ ............................................. C03B 37/04
[52] U.S. Cl. ............................................. 65/8; 65/14; 264/8; 264/12; 425/7; 425/8
[58] Field of Search .................... 65/8, 14, 6, 7, 15, 65/16; 264/8, 12; 425/7, 8

[56] References Cited

U.S. PATENT DOCUMENTS

| | | | |
|---|---|---|---|
| 3,044,110 | 7/1962 | Hess | 65/14 |
| 3,881,903 | 5/1975 | Stalego | 65/16 |
| 3,928,009 | 12/1975 | Perry | 65/14 |
| 4,046,539 | 9/1977 | Pitt | 65/8 X |

OTHER PUBLICATIONS

"Applications of the Coanda Effect", *Scientific American*, 6/1966, pp. 84–92.
*Foundations of Aerodynamics: Bases of Aerodynamic Design*, third Ed., Wiley & Sons, Kuethe et al., pp. 417–419, 1975.

*Primary Examiner*—Robert L. Lindsay, Jr.
*Attorney, Agent, or Firm*—Ronald C. Hudgens; Philip R. Cloutier; Ted C. Gillespie

[57] ABSTRACT

A method and apparatus for forming fibers from molten mineral material comprising a rotatably mounted spinner having an orificed peripheral wall through which the material flows to form primary fibers, and a blower adapted to discharge a flow of gases to further attenuate the primary fibers into a veil of secondary fibers, a curved surface being positioned so that the flow of gases follows the contour of the curved surface according to the Coanda effect.

15 Claims, 7 Drawing Figures

4,246,017

METHOD AND APPARATUS FOR FORMING MINERAL FIBERS

TECHNICAL FIELD

This invention relates to forming fibers from molten mineral material, such as forming glass fibers from molten glass. In one of its more specific aspects, this invention relates to flowing molten mineral material through orifices in the peripheral wall of a spinner to form primary fibers, and further attenuating the primary fibers into secondary fibers by the action of a flow of gases from a blower.

BACKGROUND OF THE INVENTION

A common practice in forming fibers of mineral material is to pass material in a molten state through the orifices of the peripheral wall of a centrifuge or spinner to create primary fibers. Thereafter, the primary fibers are further attenuated into a veil of secondary fibers of smaller diameter by the action of a flow of gases discharged downwardly from a blower. It is known in the prior art that such blowers can be annular in shape and can be adapted to blow air, steam or other gases. It is also known in the prior art that the air drag attenuation provided to the primary fibers by the flow of gases from the blower can be greatly increased by creating some turbulence in the flow of gases. The air drag attenuation can also be increased by inducing a flow of air to pass over the top of the blower and intermediate the blower and the spinner peripheral wall. The combination of the flow of gases from the blower and the induced air attenuates the primary fibers into secondary fibers and cools and quenches the fibers, causing them to break into finite lengths.

One of the problems associated with the blowers of the fiber-forming devices of the prior art is that such blowers consume large amounts of energy. Improvements to fiber-forming devices which increase the amount of induced air or facilitate a reduction in the amount of energy required by the blower are needed. Another problem of the prior art devices is that the heat from the burner causes excessive deterioration of the blower discharge port. An additional problem with the devices of the prior art is that the fiber veils are unsteady and exhibit some fiber clumping.

The present invention is directed toward a fiber-forming apparatus which greatly increases the amount of air induced by the blower, and which may reduce the amount of energy which must be expended by the blower in the fiberizing process. The present invention also substantially reduces deterioration of the blower discharge port by positioning the discharge port so as to be subject to less heat from the burner than is common with the blowers of the prior art. Also, the fiber forming apparatus of the present invention produces a more steady fiber veil exhibiting a lack of fiber roping or clumping.

SUMMARY OF THE INVENTION

According to this invention, there is provided apparatus for forming fibers from molten mineral material comprising a rotatably mounted spinner, the spinner having an orificed peripheral wall through which molten mineral material flows to form primary fibers, and a blower adapted to discharge a flow of gases to further attenuate the primary fibers into a veil of secondary fibers, wherein the improvement comprises a blower discharge port adapted to discharge the flow of gases along a line forming an angle with the peripheral wall within the range of from about 60 degrees to about 90 degrees, and a curved surface positioned so that the flow of gases follows the contour of the curved surface according to the Coanda effect. The blower can be positioned so that air is induced by the discharge flow of gases and flows across the top of the blower and intermediate the spinner peripheral wall and the blower. In one of the more preferred embodiments of the invention, the angle formed by the line and the peripheral wall is within the range of from about 70 degrees to about 80 degrees.

In one of the most preferred embodiments of the invention, the angle formed by the line and the peripheral wall is about 75 degrees.

In another embodiment of the invention, the discharge port is positioned above the bottom wall of the spinner.

In another embodiment of the invention, the curved surface is spaced apart from the discharge port in a direction generally perpendicular to the line. In a most preferred embodiment, the line intersects the spinner peripheral wall.

In one of its more preferred embodiments, the curved surface is grooved to promote mixing of the gases. The grooves can be annular or radial and vertical, and they can also be helical.

According to this invention, there is also provided a method for forming molten mineral material comprising flowing molten mineral material through orifices in the peripheral wall of a rotating spinner to form primary fibers, attenuating the primary fibers into a veil of secondary fibers by discharging a flow of gases from a blower along a line forming an angle with the spinner peripheral wall within the range of from about 60 degrees to about 90 degrees, and positioning a curved surface so that the flow of gases follows the contour of the curved surface according to the Coanda effect.

In a preferred embodiment of the invention, a flow of air is induced across the top of the blower and intermediate the spinner peripheral wall and the blower.

In an additional embodiment, the angle formed by the line and the spinner peripheral wall is within the range of from about 70 degrees to about 80 degrees.

In the most preferred embodiment of the invention, the angle formed by the line and the spinner peripheral wall is about 75 degrees.

DESCRIPTION OF THE INVENTION

Figure 1:
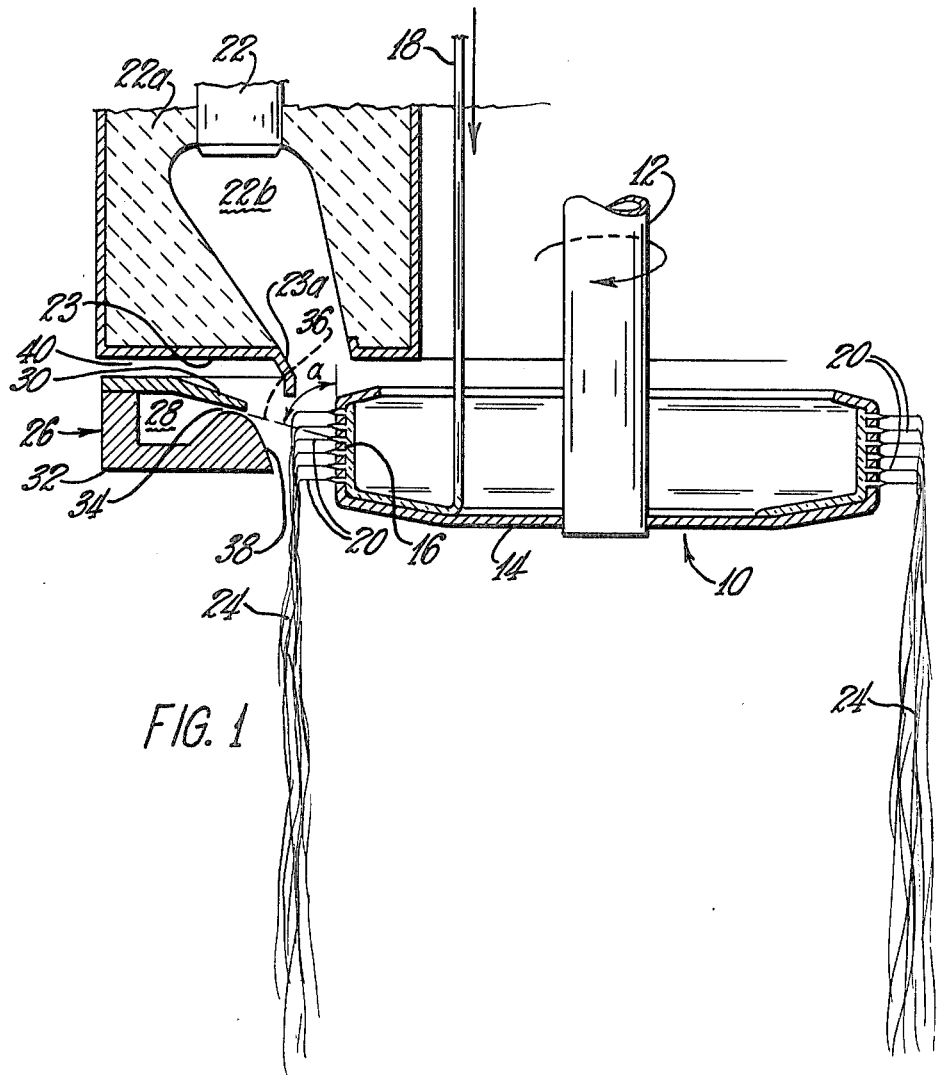
FIG. 1 is a schematic view in elevation of apparatus for forming mineral fibers according to the principles of this invention.

As shown in FIG. 1, spinner 10 is mounted for rotation on quill 12 and is comprised of spinner bottom wall 14 and orificed peripheral wall 16. Molten glass stream 18 drops into the bottom of the spinner and flows outwardly and upwardly to the spinner peripheral wall through which it passes to form primary fibers 20. The primary fibers are maintained in a plastic, attenuable condition by the heat supplied from annular burner 22. The burner can be adapted with combustion chamber 22b and can be insulated with refractory material 22a. Burner bottom wall 23, which supports the refractory material, terminates in downwardly thrusting flame ring 23a.

The primary fibers are further attenuated into secondary fibers 24 by the action of a flow of gases discharged from annular blower 26. The flow of gases discharged from the blower can be air, steam, or any suitable combination of gases. Typically, the forcing of the molten mineral material through the spinner peripheral wall produces a primary fiber having a diameter of approximately 15 microns, whereas the attenuation by the flow of gases from the blower produces secondary fibers having diameters of approximately 7 microns.

Annular blower manifold 28 is surrounded by top blower plate 30 and bottom blower plate 32, which are positioned to define blower discharge port 34. The discharge port is preferably positioned to discharge the flow of gases above the spinner bottom wall. The discharge port discharges the flow of gases from the blower along phantom discharge line 36. As shown in FIG. 1, the discharge line can intersect the spinner peripheral wall, and forms an angle "alpha" with the spinner peripheral wall. According to the principles of this invention, the angle formed by the line of discharge and the spinner peripheral wall is within the range of from about 60 degrees to about 90 degrees, and preferably within the range of from about 70 degrees to about 80 degrees. In the most preferred embodiment, the angle formed by the line of discharge and the spinner peripheral wall is approximately 75 degrees.

Coanda surface 38 is positioned adjacent the blower discharge port so that the flow of gases follows the contour of the Coanda surface according to the Coanda effect. Thus, although the flow of gases is discharged outwardly from the discharge port along the line of discharge, the gases are forced to change direction and turn downwardly by the Coanda effect of the Coanda surface.

The use of the Coanda surface enables the blower discharge port to be positioned further from the burner than is possible in conventional fiber-forming devices, thereby prolonging the life of the blower and, particularly, the portions of the blower defining the blower discharge port. The blower discharge port can be positioned so that the flame ring blocks direct heat from the burner.

A flow of air through induced air passageway 40, which is defined by the burner bottom wall and the top blower plate, is induced by the flow of gases discharged from the blower. The induced air flows downwardly intermediate the blower and the spinner peripheral wall. The induced air adds to the attenuating effect of the flow of gases from the blower, and also serves to quench and break the fibers into finite lengths.

Figure 5:
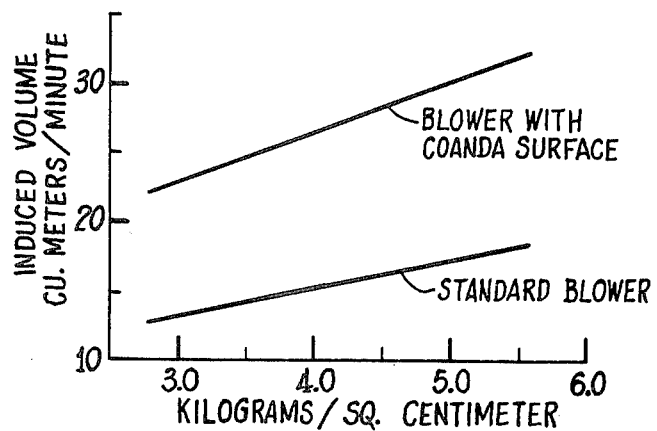
FIG. 5 is a graph showing the increased flow of induced air resulting from use of the invention.

It has been found that the flow of induced air is increased by approximately 100% using a blower having a Coanda surface rather than a conventional surface. As a result of the increased flow of induced air, greater amounts of cooling air act on the primary fibers. A reduced flow of gases from the blower may thereby be made possible. For example, apparatus for centrifuging glass fibers from molten glass was first operated with a standard blower, and then adapted with a blower having a Coanda surface according to the principles of this invention. As shown from the results in FIG. 5, the induced air increased by approximately 100% for the blower having the Coanda surface.

It is seen from the above that the use of a blower with a Coanda surface according to the principles of this invention provides an unexpected increase in the flow of induced air.

Figure 2:
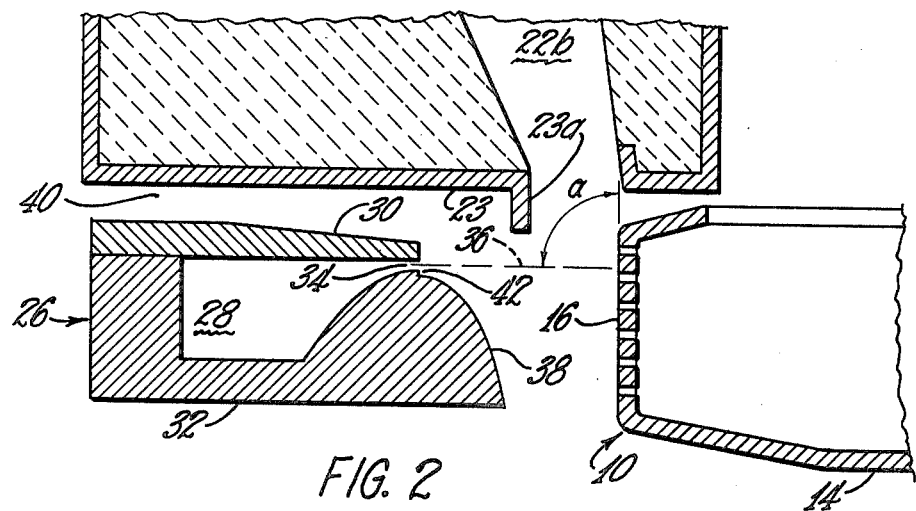
FIG. 2 is a schematic view in elevation of the spinner, burner and blower of another embodiment of apparatus for forming mineral fibers according to the principles of this invention.

As shown in FIG. 2, the line of discharge of gases from the discharge port can be generally perpendicular to the spinner peripheral wall, i.e., the angle "alpha" can be 90 degrees. Also, the bottom blower plate contains step 42 which serves to space the Coanda surface apart from the discharge port in a direction generally perpendicular to the line of discharge of gases in order to create additional turbulence for more effective attenuation of the primary fibers into secondary fibers.

Figure 3:
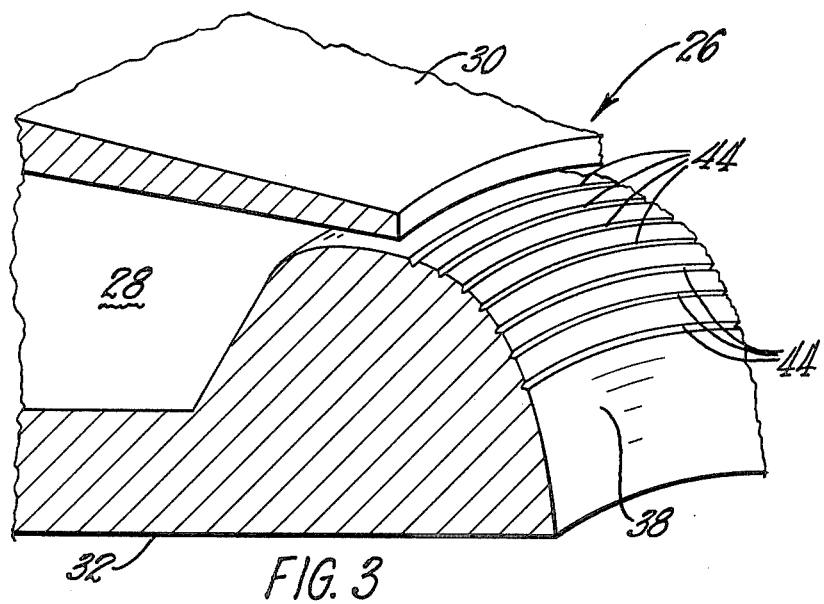
FIG. 3 is a schematic perspective view of an annularly grooved Coanda surface according to one of the embodiments of this invention.
Figure 6:
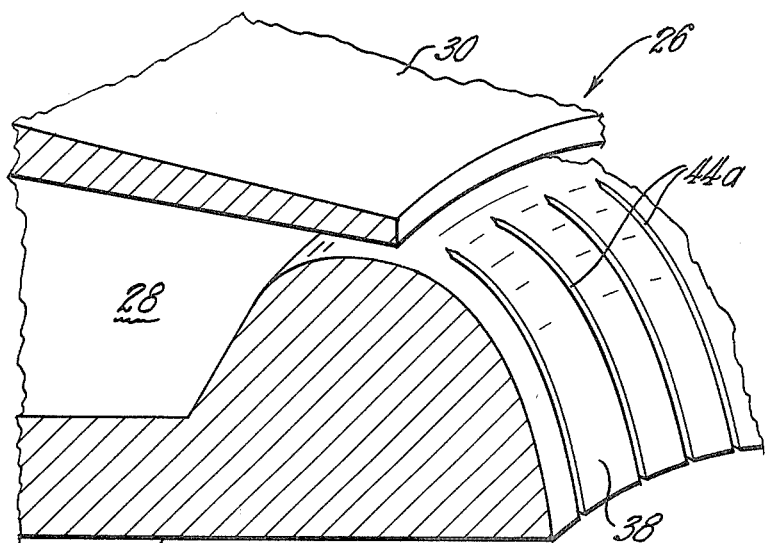
FIG. 6 is a schematic perspective view of a grooved Coanda surface of the invention in which the grooves are radial and vertical.
Figure 7:
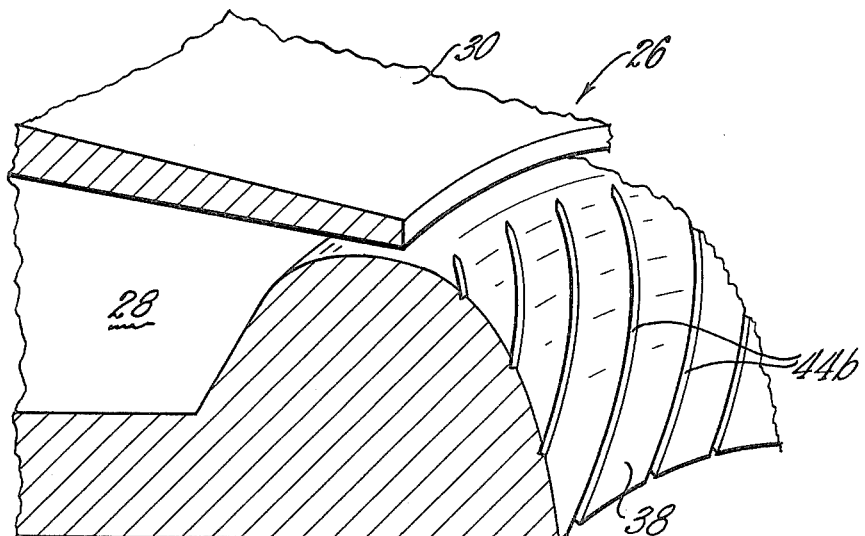
FIG. 7 is a schematic perspective view of a grooved Coanda surface of the invention in which the grooves are helical.

As shown in FIG. 3, the Coanda surface can contain a plurality of laterally extending grooves 44 which creates turbulence within the flow of gases for increased attenuation of the primary fibers into secondary fibers. As shown in FIG. 6, grooves 44a can extend radially from the discharge port toward the spinner peripheral wall, and then curve downwardly, following the radius of curvature of the Coanda surface. Grooves 44b can also be helical, as shown in FIG. 7.

Figure 4:
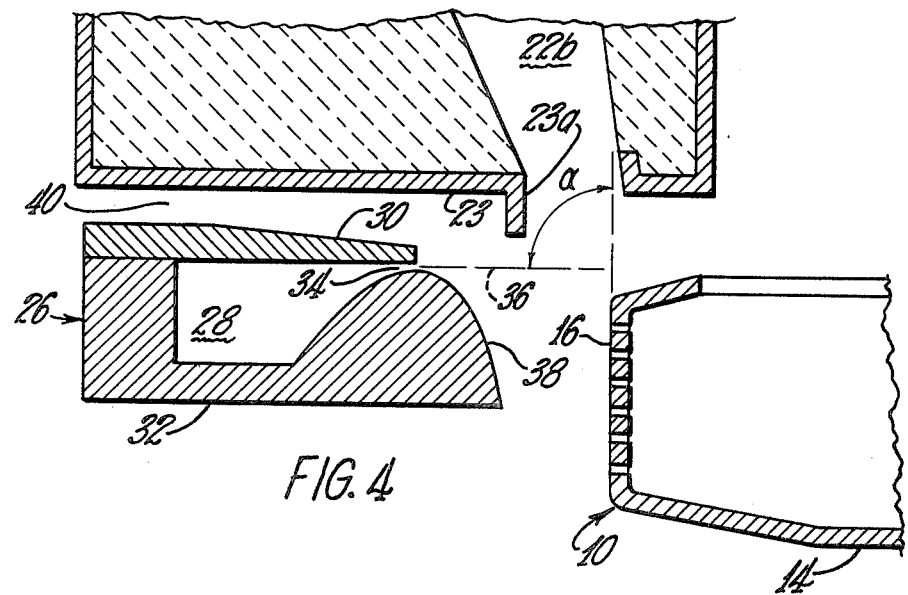
FIG. 4 is a schematic view of the apparatus of the invention in which the blower gases are discharged at a locus above the spinner.

The embodiment shown in FIG. 4 illustrates that even though the blower gases can be discharged at a locus above the spinner, the line of discharge of the blower gases still forms an angle "alpha" with the spinner peripheral wall, where the angle "alpha" is within the range of from about 60 degrees to about 90 degrees.

EXPLOITATION IN INDUSTRY

This invention will be found to be useful in the formation of fibers from molten glass for such uses as glass fiber thermal insulation products and glass fiber acoustical insulation products.

I claim:

1. In apparatus for forming fibers from molten mineral material comprising a rotatably mounted spinner, said spinner having an orificed peripheral wall through which molten mineral material flows to form primary fibers, and a blower adapted to discharge a flow of gases to further attenuate said primary fibers into a veil of secondary fibers, wherein the improvement comprises a blower discharge port adapted to discharge said flow of gases along a line forming an angle with said peripheral wall within the range of from about 60 degrees to about 90 degrees, and a curved surface positioned so that said flow of gases follows the contour of the curved surface according to the Coanda effect.

2. The apparatus of claim 1 in which said blower is positioned so that said flow of gases induces air to flow across the top of said blower and intermediate said spinner peripheral wall and said blower.

3. The apparatus of claim 2 in which said angle is within the range of from about 70 degrees to about 80 degrees.

4. The apparatus of claim 3 in which the angle is about 75 degrees.

5. The apparatus of claims 2, 3 or 4 in which said spinner has a bottom wall and said discharge port is positioned above said bottom wall.

6. The apparatus of claims 2, 3 or 4 in which said curved surface is spaced apart from said discharge port in a direction generally perpendicular to said line.

7. The apparatus of claims 2, 3 or 4 in which said line intersects said spinner peripheral wall.

8. The apparatus of claims 2, 3 or 4 in which said curved surface is grooved to promote mixing of said gases.

9. The apparatus of claim 8 in which said grooves are annular, extending laterally around said curved surface.

10. The apparatus of claim 8 in which said grooves extend toward said spinner peripheral wall from said discharge port and curve downwardly.

11. The apparatus of claim 10 in which said grooves are helical.

12. In a method for forming fibers from molten mineral material in which molten mineral material is flowed through orifices in the peripheral wall of a rotating spinner to form primary fibers and the primary fibers are further attenuated into a veil of secondary fibers by discharging a flow of gases from a blower, wherein the improvement comprises discharging said flow of gases along a line forming an angle with said spinner peripheral wall within the range of from about 60 degrees to about 90 degrees, and positioning a curved surface so that said flow of gases follows the contour of said curved surface according to the Coanda effect.

13. The method of claim 12 comprising inducing a flow of air across the top of said blower and intermediate said spinner peripheral wall and said blower.

14. The method of claim 13 in which said angle is within the range of from about 70 degrees to about 80 degrees.

15. The method of claim 13 in which said angle is about 75 degrees.

* * * * *